United States Patent Office 2,724,703
Patented Nov. 22, 1955

2,724,703

REGENERATION OF PLATINUM-CONTAINING CATALYST WITH NITROSYL CHLORIDE

Charles L. Thomas, Swarthmore, Pa., assignor to Sun Oil Company, Philadelphia, Pa., a corporation of New Jersey No Drawing. Application September 16, 1954,
Serial No. 456,626

8 Claims. (Cl. 252—411)

This invention relates to the reactivation of platinum-containing catalysts that have become deactivated in processes for converting hydrocarbons.

Catalysts containing relatively small quantities of platinum are effective in processes for converting hydrocarbons. For example, such catalysts are known to be effective for "reforming" hydrocarbons, i. e., for converting hydrocarbons of low octane rating boiling in the gasoline range to other hydrocarbons of high octane rating also boiling in the gasoline range. In such processes the catalyst slowly loses its activity and must be replaced when the activity decrease renders the process uneconomical. The loss of catalytic activity may be due to changes in structure of the platinum, especially when the hydrocarbon conversion process using the catalyst is operated under high temperature conditions, to the deposition of carbonaceous materials or a metal or metallic oxide on the catalyst, or to a combination of such factors.

Platinum-containing catalysts have heretofore been regenerated by heating to a high temperature in the presence of an oxygen-containing gas for relative long periods of time, say from about 1 to 24 hours. While this treatment is effective for removing carbonaceous materials from the catalyst, the initial activity is seldom restored since such treatment generally does not remove deposits of metals or metallic oxides, and also may cause a structural change in the platinum to the detriment of its catalytic activity.

It has now been found that platinum-containing catalysts that have become deactivated in hydrocarbon conversion processes can be regenerated by contacting the deactivated catalyst with nitrosyl chloride, as hereinafter described.

Platinum-containing catalysts that can be reactivated in the process of the invention are those which have become deactivated in a process for converting hydrocarbons and which contain from about 0.001 to 10%, and usually from 0.01% to 1%, by weight of platinum deposited on a carrier such as alumina. Other materials can be present in minor amounts, such as silica or halogen, and good results obtained.

In one embodiment the invention relates to a method of reactivating a platinum-containing catalyst deactivated by deposition thereon of carbonaceous materials. In this embodiment the carbonaceous deposit is substantially removed by heating the catalyst with an oxygen-containing gas to an elevated temperature of from about 800° F. to about 1200° F. for a period of from about 1 to 24 hours. The catalyst is then contacted with nitrosyl chloride as hereinafter described.

In another embodiment the invention relates to a method of reactivating a platinum-containing catalyst deactivated by structural changes in the platinum. In this embodiment the deactivated catalyst, after purging hydrocarbons therefrom, is contacted with nitrosyl chloride.

In a further embodiment the invention relates to a method of reactivating a platinum-containing catalyst deactivated by deposition thereon of one or more metals, one or more metallic oxides, or mixtures thereof. In this embodiment the deactivated catalyst, after purging hydrocarbons therefrom, is contacted with nitrosyl chloride.

The purging of the deactivated catalyst prior to contacting with nitrosyl chloride in the above-described embodiments is advantageously accomplished by flushing with steam or an inert gas.

The nitrosyl chloride can be in liquid or gas phase when contacted with the deactivated catalyst. In an embodiment of the invention a solution of nitrosyl chloride in an aliphatic chloride is contacted with the deactivated catalyst. It is preferred to employ nitrosyl chloride in the gaseous phase. In this embodiment, nitrosyl chloride preferably at atmospheric temperature and pressure is contacted with the deactivated catalyst. However, if desired, somewhat elevated temperatures can be employed, say temperatures up to about 400° F., and elevated pressures insufficient to liquify the nitrosyl chloride at the temperature employed can be used. The time of contacting the nitrosyl chloride with the catalyst can be varied substantially and good results obtained. In general, the time of contacting will be from 5 minutes to 2 hours, but even longer contact times do not deleteriously affect the catalyst.

When using nitrosyl chloride in liquid phase a temperature of below about −20° F. should be maintained if atmospheric pressure is used. Higher temperatures, up to about 300° F., but preferably not over 100° F., can be used by employing a pressure sufficient to maintain the nitrosyl chloride in the liquid phase. The time of contacting using the liquid phase is preferably the same as for gas phase operation as above described.

When using nitrosyl chloride as a solution in an aliphatic chloride, it is preferred to employ carbon tetrachloride, chloroform or methylene chloride as the solvent. Concentrations of nitrosyl chloride of from 5 to 50% by weight give good results and are preferred. The temperature of treating when using a solution of nitrosyl chloride does not appear critical. Ambient temperature is employed with good results but the temperature can be varied up to about the boiling point of the solvent employed. The time of contacting the deactivated catalyst with the nitrosyl chloride solution is advantageously the same as used for gas phase contacting as above described. When relatively dilute solutions, say from about 5 to 20% nitrosyl chloride are employed, relatively long times of contacting are advantageous, say from about 1 to 2 hours and even longer contacting times can be employed if desired.

To illustrate the method of reactivating platinum-containing catalysts in accordance with the invention, a catalyst comprising about 0.1% platinum deposited on alumina which had become deactivated in a process for reforming hydrocarbons is heated to a temperature of about 1100° F. for one hour in a stream of air. At the end of one hour, the carbonaceous deposit appeared substantially removed from the catalyst but the activity thereof for reforming hydrocarbons, and especially for converting naphthenes to aromatic hydrocarbons, was not fully restored. When a portion of the catalyst from which the carbonaceous deposit had been removed, as described, is treated with nitrosyl chloride in the gas phase at atmospheric pressure for 10 minutes and the nitrosyl chloride removed by heating the catalyst to a temperature of about 600° F. in a stream of inert gas such as nitrogen, the activity thereof toward reforming hydrocarbons is restored to substantially its initial activity.

When the foregoing process is repeated using nitrosyl chloride in the liquid phase, or as a solution in an aliphatic chloride as above described, substantially equivalent results are obtained.

The nitrosyl chloride must be substantially removed from the catalyst before placing the reactivated catalyst in service for the conversion of hydrocarbons. This may be accomplished as above described, namely by heating and flushing with an inert gas. Nitrosyl chloride tends to be decomposed at elevated temperatures and is readily flushed from the catalyst. Sub-atmospheric pressure can be employed to assist in the removal if desired. Another method of removing nitrosyl chloride that gives good results is to wash the reactivated catalyst with an aliphatic chloride such as chloroform, carbon tetrachloride, or methylene chloride. A further method of removing nitrosyl chloride which is especially advantageous when the platinum-containing catalyst has been treated with nitrosyl chloride in the gas phase is to contact the reactivated catalyst with hydrogen. The so-treated catalyst is then washed with water and dried. However, it is essential that hydrogen be absent from the process at least until the reactivation of the catalyst is complete, i. e., hydrogen must be absent until removal of the nitrosyl chloride is desired.

As above described, the deactivation of platinum-containing catalysts may be due to a combination of factors, and the process of the invention is effective to reactivate the catalyst regardless of what combination of factors caused the deactivation. Thus, where deactivation is the result of carbonaceous deposits and a structural change in the platinum, treatment as described in the above illustration restores the catalyst to its initial activity. Likewise, where deactivation is the result of metallic deposits and a structural change in the platinum, treatment as described in the above illustration, except that contacting with air at an elevated temperature can be omitted, restores the catalyst to its initial activity.

Other embodiments of the invention will be apparent to those skilled in the art. For example, the use of various solvents for nitrosyl chloride, such as methylene chloride, ethylene chloride, and the like, give good results, as does the use of such solvents for removing nitrosyl chloride from the treated catalyst.

Also, when nitrosyl chloride is contacted in gas phase with the deactivated catalyst, an inert gaseous diluent, such as a relatively low molecular weight aliphatic chloride, can advantageously be used in some instances, the process being operated under conditions of temperature and pressure that maintain the chloride in the gas phase. A still further embodiment is to omit the water washing step used after contacting the catalyst with hydrogen for the removal of nitrosyl chloride. In this embodiment any residual material, such as ammonium chloride, is removed with the hydrocarbon stream on resuming the operation for converting hydrocarbons.

The invention claimed is:

1. Method of reactivating a platinum-containing catalyst which has become deactivated in a process for converting hydrocarbons which comprises contacting the deactivated platinum-containing catalyst with nitrosyl chloride.

2. Method of reactivating a platinum-containing catalyst which has become deactivated in a process for converting hydrocarbons which comprises contacting the deactivated platinum-containing catalyst with nitrosyl chloride for from 5 minutes to 2 hours, and removing nitrosyl chloride from the reactivated catalyst.

3. Process according to claim 2 wherein said nitrosyl chloride is in the gas phase.

4. Process according to claim 2 wherein said nitrosyl chloride is in the liquid phase.

5. Process according to claim 2 wherein said nitrosyl chloride is dissolved in an aliphatic chloride.

6. Method of reactivating a catalyst containing from about 0.01% to about 1% by weight of platinum which has become deactivated in a process for converting hydrocarbons which comprises treating said catalyst with air at a temperature of from about 800° F. to 1200° F. for a period of from about 1 to 24 hours, treating the catalyst with nitrosyl chloride for from 5 minutes to 2 hours, and removing nitrosyl chloride from the catalyst.

7. Process according to claim 6 wherein said nitrosyl chloride is removed from the catalyst by washing the catalyst with an aliphatic chloride.

8. Process according to claim 6 wherein said nitrosyl chloride is removed from the catalyst by contacting the catalyst with hydrogen, washing with water, and drying.

References Cited in the file of this patent

UNITED STATES PATENTS 2,692,240     Sprauer _____ Oct. 19, 1954

FOREIGN PATENTS 20,915 of 1902     Great Britain _____ July 9, 1903